(12) United States Patent
Weichman et al.

(10) Patent No.: US 10,698,103 B2
(45) Date of Patent: Jun. 30, 2020

(54) SYSTEM AND METHOD FOR GENERATING HIGH-RESOLUTION IMAGERY USING ELECTROMAGNETIC SIGNALS

(71) Applicant: BAE SYSTEMS INFORMATION AND ELECTRONIC SYSTEMS INTEGRATION INC., Nashua, NH (US)

(72) Inventors: Peter B. Weichman, Bedford, MA (US); Ira Ekhaus, Arlington, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 447 days.

(21) Appl. No.: 15/625,468

(22) Filed: Jun. 16, 2017

(65) Prior Publication Data
US 2018/0364351 A1    Dec. 20, 2018

(51) Int. Cl.
*G01S 13/90* (2006.01)
*G01S 7/20* (2006.01)

(52) U.S. Cl.
CPC ............... *G01S 13/90* (2013.01); *G01S 7/20* (2013.01)

(58) Field of Classification Search
CPC .................................. G01S 13/90; G01S 7/20
See application file for complete search history.

(56) References Cited

U.S. PATENT DOCUMENTS

| 9,581,967 B1* | 2/2017 | Krause ..................... G03H 1/32 |
| 2002/0147544 A1* | 10/2002 | Nicosia ................. F21V 21/108 |
| | | 701/500 |
| 2006/0028373 A1* | 2/2006 | Fullerton ................ F41H 11/00 |
| | | 342/67 |

(Continued)

OTHER PUBLICATIONS

Meng et al., "MIMO-Based Forward-Looking SAR Imaging Algorithm and Simulation," International Journal of Antennas and Propagation, Jul. 15, 2014, 9 pages, vol. 2014, Article ID 783949, Hindawi Publishing Corporation, http://dx.doi.org/10.1155/2014/783949 (Year: 2014).*

(Continued)

*Primary Examiner* — Timothy A Brainard
(74) *Attorney, Agent, or Firm* — Sand, Sebolt & Wernow LPA; Scott J. Asmus

(57) ABSTRACT

A system and method for generating high-resolution imagery using electromagnetic signals includes a moveable vehicle and a multiple-input multiple-output (MIMO) radar system carried by the vehicle. The MIMO radar system includes an antenna array having a plurality of antenna elements. One or more of the antenna elements transmits electromagnetic signals towards a target area and one or more of the antenna elements receives back-scattered electromagnetic signals reflected from the target area. The system generates high-resolution three-dimensional imagery based on back-scattered electromagnetic signal data with system performance characterized by: (a) down range resolution $\Delta R$; (b) cross-range resolution $\Delta X$; and (c) vertical resolution $\Delta H$. The system exploits effective synthetic aper- (Continued)

tures to improve cross-range resolution ΔX and vertical resolution ΔH based on, at least in part, the movement of the vehicle along the trajectory and a width and height of the antenna array relative to the target area.

23 Claims, 4 Drawing Sheets

(56) References Cited

U.S. PATENT DOCUMENTS

| | | | | |
|---|---|---|---|---|
| 2009/0102705 | A1* | 4/2009 | Obermeyer | G01S 13/90 342/25 F |
| 2012/0274499 | A1* | 11/2012 | Chang | G01S 7/42 342/107 |
| 2013/0169485 | A1* | 7/2013 | Lynch | G01S 3/72 342/417 |
| 2016/0131757 | A1* | 5/2016 | Duncan | H01Q 1/288 342/25 C |
| 2016/0157828 | A1* | 6/2016 | Sumi | G01N 29/0654 702/189 |
| 2016/0379462 | A1* | 12/2016 | Zack | G01S 7/411 340/539.12 |

OTHER PUBLICATIONS

Meng et al., "MIMO-Based Forward-Looking SAR Imaging Algorithm and Simulation," International Journal of Antennas and Propagation, Jul. 15, 2014, 9 pp., vol. 2014, Article ID 783949, Hindawi Publishing Corporation, http://dx.doi.org/10.1155/2014/783949.

Soumekh, Mehrdad. "Automatic aircraft landing using interferometric inverse synthetic aperture radar imaging." IEEE transactions on image processing 5.9 (1996): 1335-1345.

Lam Nguyen, Signal and Image Processing Algorithms for the U.S. Army Research Laboratory Ultra-wideband (UWB) Synchronous Impulse Reconstruction (SIRE) Radar, Army Research Laboratory, Apr. 2009, 68 pages, ARL-TR-4784, Army Research Laboratory, Adelphi, MD 20783.

Lam Nguyen and Mehrdad Soumekh, System Trade Analysis for an Ultra-wideband Forward Imagining Radar, Unmanned Systems Technology VIII , 2006, 12 pages, Proceedings of SPIEvol. 6230, 623003, United States.

* cited by examiner

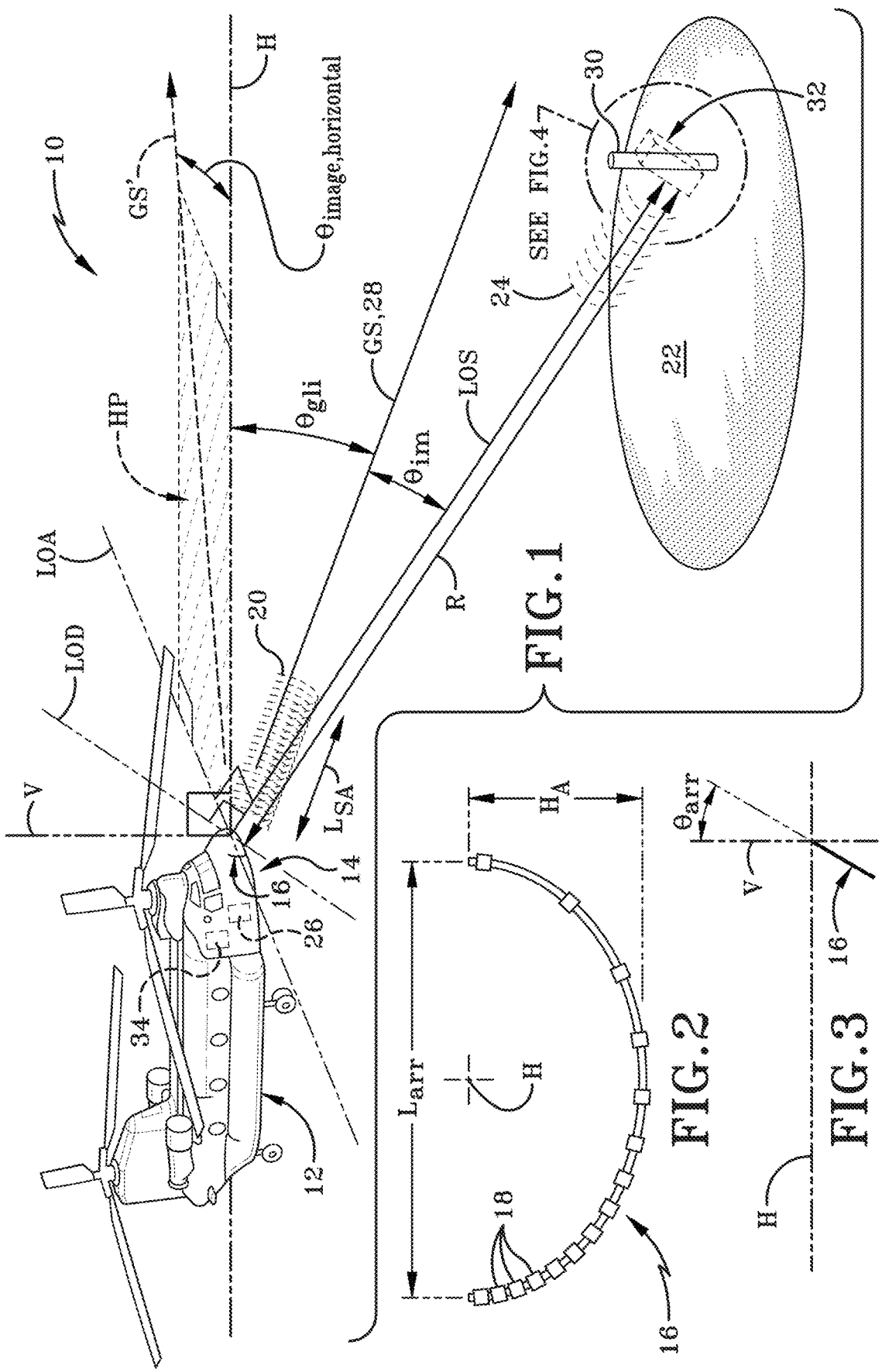

SYSTEM AND METHOD FOR GENERATING HIGH-RESOLUTION IMAGERY USING ELECTROMAGNETIC SIGNALS

BACKGROUND

Technical Field

The present disclosure relates generally to radar systems. More particularly, the present disclosure relates to utilizing a radar system to generate high-resolution imagery. Specifically, the present disclosure relates to utilizing a multiple-input multiple output (MIMO) radar system to generate high-resolution three-dimensional imagery.

Background Information

Tactical remote sensing scenarios, such as rotorcraft landing, may become problematic when operating in a degraded visual environment (DVE) caused by, among other things, dust, fog and other fine-grained optical impediments. Examples of DVEs include 'brownouts' or 'whiteouts' caused by the rotation of the rotorcraft rotor blades in dusty, sandy or snowy areas. As the rotorcraft encounters the DVE, the operator of the rotorcraft may lose visual situational awareness and undergo spatial disorientation which may cause accidents and/or otherwise impede the operator from safely landing the rotorcraft.

One of the key technologies for penetrating DVEs is radar systems, where the radar systems may be used to create two-dimensional and three-dimensional images of imaged areas. However, data collection and data exploitation challenges associated with radar systems typically need to be addressed. Some of those challenges may include, amongst others, associated cost, size, weight, and power (C-SWAP) limitations and their impact on achievable resolution, hardware complexity, signal processing techniques and image processing techniques. It is understood that reducing C-SWAP constraints and hardware complexity as well as creating efficient signal processing and image processing techniques associated with radar systems is beneficial to creating a solution for remote tactical sensing scenarios in DVEs.

SUMMARY

One issue with the current state of the art in radar systems is the use of fully populated, or dense, antenna arrays which may be expensive and characterized by extremely complex engineering challenges. Thus, a need exists for a solution to reduce C-SWAP constraints and hardware complexity as well as create efficient signal processing and image processing techniques associated with radar systems to create pilotage high quality or high-resolution three-dimensional imagery to be utilized in remote tactical sensing scenarios in DVEs. The present disclosure addresses this and other issues by making use of a multiple-input multiple-output sparse antenna, array as the sparse antenna array is lighter in weight and lower in cost than fully populated or dense arrays, and by making use of efficient signal processing and image processing techniques to generate a high-resolution three-dimensional imagery. These are exemplary benefits.

In one aspect, the present disclosure may provide a system for generating high-resolution imagery using electromagnetic signals comprising a moveable vehicle and a multiple-input multiple-output (MIMO) radar system. The MIMO radar system may comprise an antenna array having a plurality of antenna elements carried by the vehicle. The vehicle and the antenna array may move in a trajectory forming effective synthetic apertures in a nominal first and second direction. One or more of the antenna elements may transmit electromagnetic signals towards a target area and one or more of the antenna elements may receive back-scattered electromagnetic signals reflected from the target area. The system may further include at least one non-transitory computer readable storage medium having instructions encoded thereon that, when executed by one or more processors, result in the following operations for generating high-resolution three-dimensional imagery based on back-scattered electromagnetic signal data with system performance characterized by: (a) down range resolution $\Delta R$; (b) cross-range resolution $\Delta X$; and (c) vertical resolution $\Delta H$; the operations configured to exploit the effective synthetic apertures in the nominal first and second direction to improve cross-range resolution $\Delta X$ and vertical resolution $\Delta H$ based on, at least in part, the movement of the vehicle along the trajectory and a width and height of the antenna array relative to the target area.

In another aspect, the present disclosure may provide a system for generating high-resolution imagery using electromagnetic signals comprising a moveable vehicle and a multiple-input multiple-output (MIMO) radar system. The MIMO radar system may comprise an antenna array having a plurality of antenna elements carried by the vehicle. The vehicle and the antenna array may move in a trajectory forming an effective synthetic aperture in a nominal first direction. One or more of the antenna elements may transmit electromagnetic signals towards a target area and one or more of the antenna elements may receive back-scattered electromagnetic signals reflected from the target area. The system may further include at least one non-transitory computer readable storage medium having instructions encoded thereon that, when executed by one or more processors, result in the following operations for generating high-resolution three-dimensional imagery based on back-scattered electromagnetic signal data, the operations configured to exploit the effective synthetic aperture in the nominal first direction to improve the vertical resolution $\Delta H$ based on, at least in part, the movement of the vehicle in a trajectory and a height of the antenna array relative to the target area.

In another aspect, the present disclosure may provide a method for generating high-resolution imagery using electromagnetic signals comprising mounting a multiple-input multiple-output (MIMO) radar system including an antenna array having a plurality of antenna elements on a vehicle. The method may further include moving the vehicle in a trajectory. The method may further include forming effective synthetic apertures in a nominal first and second direction. The method may further include transmitting electromagnetic signals using one or more of the antenna elements toward a target area and illuminating the target area. The method may further include receiving back-scattered electromagnetic signals reflected from the target area at one or more of the antenna elements and processing the received back-scattered electromagnetic signals. The method may further include generating a three-dimensional image with system performance characterized by: (a) down range resolution $\Delta R$; (b) cross-range resolution $\Delta X$; and (c) vertical resolution $\Delta H$. The method may further include displaying the three-dimensional image.

In another aspect, the present disclosure may provide a system and method for generating high-resolution imagery using electromagnetic signals including a moveable vehicle and a multiple-input multiple-output (MIMO) radar system carried by the vehicle. The MIMO radar system includes an antenna array having a plurality of antenna elements. One or more of the antenna elements transmit electromagnetic signals towards a target area and one or more of the antenna elements receive back-scattered electromagnetic signals reflected from the target area. The system generates high-resolution three-dimensional imagery based on back-scattered electromagnetic signal data with system performance characterized by: (a) down range resolution ΔR; (b) cross-range resolution ΔX; and (c) vertical resolution ΔH. The system exploits effective synthetic apertures to improve cross-range resolution ΔX and vertical resolution ΔH based on, at least in part, the movement of the vehicle along the trajectory and a width and height of the antenna array relative to the target area.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 1 is a general diagrammatic view of a broad embodiment of an imaging system;

FIG. 2 is a front elevation view of a conformal sparse antenna array having irregular spacing;

FIG. 3 is an elevational side view of the antenna array showing the angle of the antenna array relative to vertical.

Similar numbers refer to similar parts throughout the drawings.

DETAILED DESCRIPTION

Figure 4:
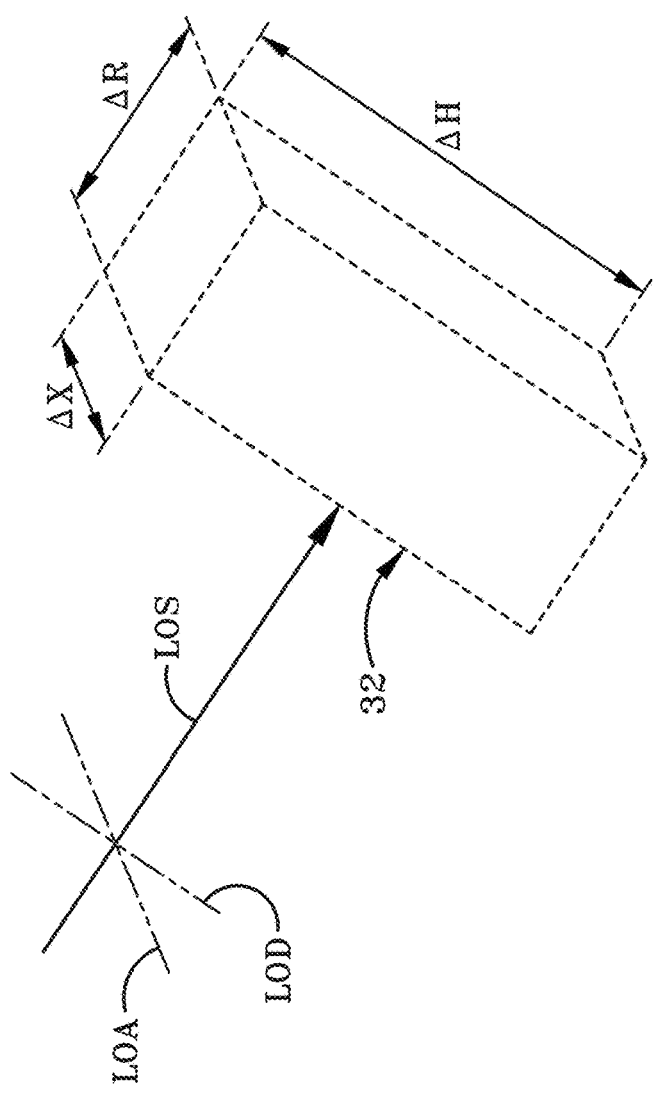
FIG. 4 is a perspective view of a three-dimensional resolution cell of the present disclosure.

In accordance with one aspect of the present disclosure, a system and method for generating high-resolution three-dimensional imagery using electromagnetic signals is provided. As depicted in FIG. 1, the imaging system is broadly depicted as 10. Imaging system 10 may include a moveable vehicle 12 and a multiple-input multiple-output (MIMO) radar system 14. The MIMO radar system 14 may include an antenna array 16 having a plurality of antenna elements 18 carried by the vehicle 12. One or more of the antenna elements 18 may transmit electromagnetic signals 20 toward a target area 22 spaced apart from the antenna elements 18 and one or more of the antenna elements 18 may receive back-scattered electromagnetic signals 24 reflected from the target area 22. The imaging system 10 may further include at least one non-transitory computer readable storage medium 26.

FIG. 1 depicts vehicle 12 as a rotorcraft, however, it is to be entirely understood that vehicle 12 is not intended to be limiting so long as it carries MIMO radar system 14. It is further understood that vehicle 12 may be an airborne vehicle or a ground-based vehicle. One or more of antenna elements 18 transmit electromagnetic signals 20 from vehicle 12 toward target area 22 and one or more antenna elements 18 receive back-scattered signals 24 at vehicle 12.

As depicted in FIG. 1 and FIG. 2, and in one example, MIMO radar system 14 may include a conformal sparse antenna array 16 mounted on a curved surface of vehicle 12. In this example, antenna array 16 may be mounted near a front region of vehicle 12 in any suitable manner such as by fasteners or the like. Further, antenna array 16 may be a nominally forward-looking one-dimensional sparse antenna array 16 and antenna array 16 may be mounted such that an antenna array length $L_{arr}$ is perpendicular to horizontal (FIG. 3). In another example, the antenna array 16 may be a self-contained assembly including a radome, which is a structural, weatherproof enclosure that protects an antenna array, antenna elements 18 and a processing unit or computer. Further, the self-contained assembly may have a limited amount of mounting points such as one or two mounting points.

It is to be understood that while conformal antenna array 16 may be utilized in one example, other suitable antenna arrays 16 may be utilized such as a linear antenna array. Further, antenna elements 18 of antenna array 16 may be irregularly spaced such as logarithmically-spaced; however, antenna elements 18 may be spaced in any suitable manner. Antenna elements 18 may be irregularly spaced to increase the effective number of distinct MIMO pairs.

The instructions defined in Equations 1 and 2 below provide distinct positions of the transmitter antenna elements 18 and the receiver antenna elements 18 over indices l and m. A MIMO pair is defined as a particular doublet of l and m values. The effective MIMO pair position is the average of $x_l$ and $x_m$ that may be provided by a rearrangement of the term |xS,−xl|+|xS,n−xm|) of Equation 1. This spatial average of distinct transmitter and receiver antenna elements 18 is a mathematical shorthand as one of ordinary skill in the art would understand. A system design that specifies irregular antenna element spacing avoids redundancy in the numerator term |xS,−xl|+|xS,n−xm|) across the summation of Equation 2 and improves the system performance by providing a substantially increased number of effective MIMO pair positions.

Figure 5:
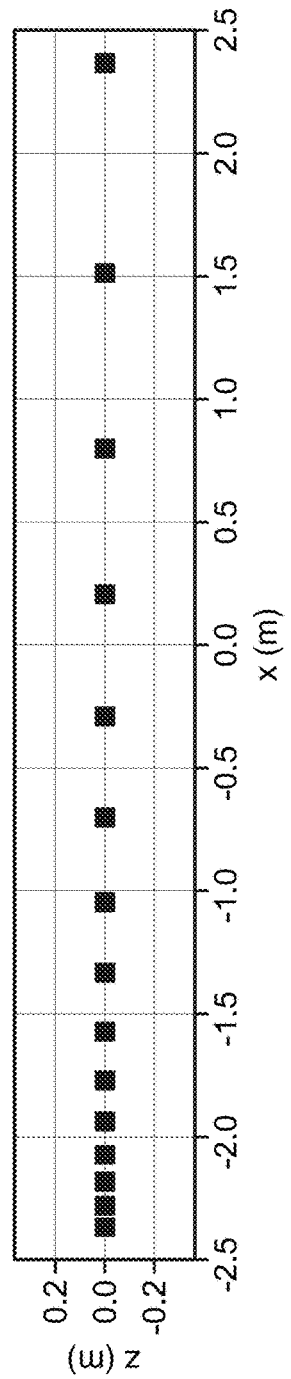
FIG. 5 is an exemplary graph of a linear sparse antenna array having logarithmic spacing.

An exemplary logarithmically-spaced linear sparse patch array is shown in FIG. 5. The irregular spacing of antenna elements 18 of antenna array 16 is suitable for mounting antenna array 16 on vehicle 12 as irregularly spaced antenna arrays 16 are, inter alia, lighter and have lower costs than dense antenna arrays; however, it is envisioned that dense antenna arrays may also be utilized as antenna array 16.

Although MIMO radars may have different configurations, in one example, plurality of antenna elements 18 of MIMO radar system 14 may be configured so that one antenna element 18 transmits (sequentially) at each time of transmission. This multiplexed transmission arrangement/scheme anticipates the back-scattered electromagnetic signals 24 being complicated reflections from the target area 22 and simplifies some aspects of the post processing. However, it is envisioned that any other suitable transmission arrangements/schemes may be utilized with MIMO radar system 14 of the present disclosure such as simultaneous transmission of multiple orthogonal coded radar waveforms via multiple antenna elements 18 at each time of transmission. The application of coded waveforms for radar applications is understood by those of ordinary skill in the art.

In one example, plurality of antenna elements 18 may be radar elements which are electronically steerable. In other words, antenna elements 18 may direct electromagnetic transmitted signals 20 in a desired direction without mechanically changing the direction of antenna array 16 and without mechanically changing the direction of antenna elements 18. Further, plurality of antenna elements 18 may be rapidly alternated between transmitting electromagnetic signals 20 and receiving back-scattered electromagnetic signals 24. Exemplary suitable antenna elements 18 are manufactured by Echodyne Corp of Bellevue, Wash., however, any suitable antenna elements 18 may be utilized. It is to be understood that the imaging system 10 of the present disclosure may be utilized with any suitable technological components and may be operated at any suitable operational frequency band.

In another example, plurality of antenna elements 18 may be radar elements which are mechanically steerable. In other words, antenna elements 18 may direct electromagnetic transmitted signals 20 in a desired direction by mechanically changing the direction of antenna array 16 and/or by mechanically changing the direction of antenna elements 18.

In yet another example, plurality of antenna elements 18 may be radar elements which are fixed. In other words, antenna elements may direct electromagnetic signals 20 in only one direction and antenna array 16 and antenna elements may not be mechanically manipulated to change directions of electromagnetic signals 20.

It is further understood that antenna elements 18 may be narrow beam or broad beam radar elements depending upon the desired configuration of the antenna array 16 and the antenna elements 18 of the MIMO radar system 14.

As depicted in FIG. 1, and in one example, target area 22 may be a landing zone, which may also be referred to as 22, for rotorcraft vehicle 12. Landing zone 22 may include various objects of interest 30 such as cables, fence posts, poles, buildings, moving vehicles or the like. As depicted in FIG. 1, object of interest 30 is a pole, which may also be referred to as 30.

FIG. 1 depicts the operation of imaging system 10. Particularly, vehicle 12 moves in a trajectory 28 along a glide slope GS towards target area 22. Trajectory 28 of vehicle 12 may be any desired exploitable trajectory. In accordance with one aspect of the present disclosure, "exploitable" may be defined as utilizing and taking advantage of any acquired information for tactical, operational, or strategic purposes. It is further understood that trajectory 28 may be a linear or a non-linear trajectory with perturbations relative to the glide slope GS that may improve the resolution characteristics dependent upon, at least in part, vehicle's 12 flight path and desired target area 22. FIG. 1 is exemplary of a linear trajectory 28; however, the MIMO back-projection logic may be utilized to exploit any suitable trajectory 28 such as a non-linear perturbation of trajectory 28.

As vehicle 12 is moving, antenna array 16 of MIMO radar system 14 traverses along glide slope GS for a distance $L_{SA}$. One or more antenna elements 18 transmit electromagnetic signals 20 toward target area 22 along a line of sight LOS axis to illuminate target area 22. Back-scattered electromagnetic signals 24 reflected from target area 22 may be received at one or more antenna elements 18. In other words, the antenna array 16 of the MIMO radar system 14 forms a combination of radar transmissions and receptions and collects the associated data which includes a combination of real aperture data and synthetic aperture data.

The combination of real aperture data and synthetic aperture data is processed by the computer in communication with the at least one non-transitory computer readable storage medium 26 having instructions encoded thereon that, when executed by one or more processors, performs various calculations to form high-resolution three-dimensional imagery of the imaged area. As shown in FIG. 4, the three-dimensional image resolution performance is characterized by a resolution cell 32 of a down range resolution dimension $\Delta R$ associated with the LOS axis, a cross-range resolution dimension $\Delta X$ associated with a line of azimuth LOA axis and a vertical resolution dimension or height dimension $\Delta H$ associated with a line of declination LOD axis as more fully described below. LOS, LOA and LOD axes form an orthogonal reference frame.

In one example, imaging system 10 may implement a MIMO back-projection logic run on a computer to form images, based on, at least in part, exploiting data associated with pairs of transmitter antenna elements 18 and receiver antenna elements 18 of antenna array 16.

The back-scattered electromagnetic signal 24 data received by antenna element 18 may be represented by:

$$\phi(x_l, x_m) = \sum_n A_{S,n} \frac{e^{ik(|x_{S,n}-x_l|+|x_{S,n}-x_m|)}}{(4\pi)^2 |x_{S,n}-x_l||x_{S,n}-x_m|} \quad \text{(Equation 1)}$$

where $x_l$ represents positions along the trajectory 28 of the transmitter antenna elements 18, $x_m$ represents positions along the trajectory 28 of the receiver antenna elements 18, $\{x_{S,n}\}$ represents locations of a set of point scatterers from target area 22, $\{A_{S,n}\}$ represents amplitudes of the set of point scatterers from target area 22 and k represents a frequency dependent wavenumber given by:

$$k=\omega/c, \omega=2\pi f \quad \text{(Equation 2)}$$

where c represents the speed of light (i.e. about 300,000 km/s [roughly 186,000 miles a second or about 1 foot per nanosecond]).

Figure 6:
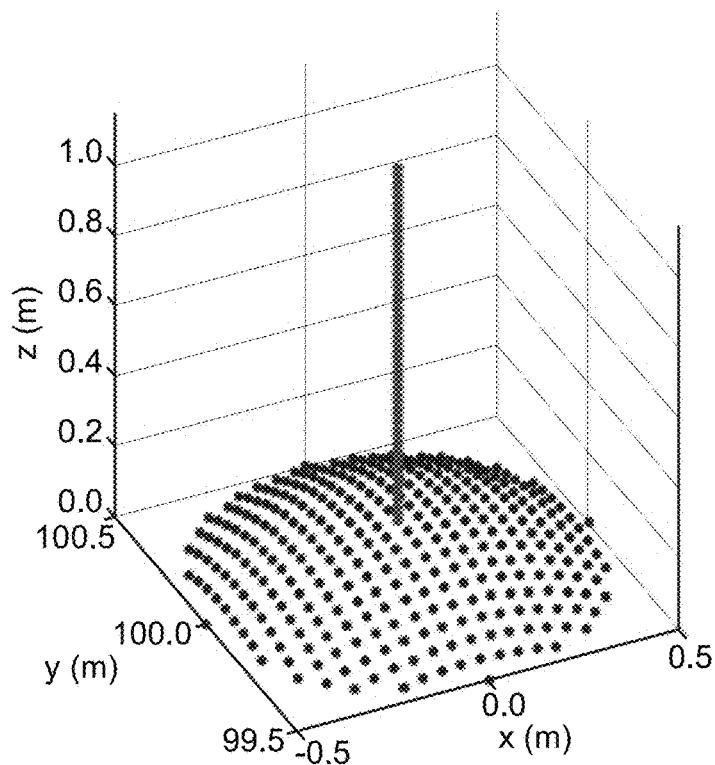
FIG. 6 is a raw three-dimensional scene map of a simulated object of interest.

Further, $x_l$ and $x_m$ are developed by vector addition of the position and orientation of the antenna elements 18 along the trajectory 28. Measurements of the position and orientation of the vehicle 12 are generated by an inertial measurement unit (IMU). This spatial data processing is understood by one of ordinary skill in the art. The vector notation of $x_l$ and $x_m$ allows for any singular antenna element 18 to contribute several data points to the final data set $\phi(x_l, x_m)$. This 'stacked' vector notation is understood by one of ordinary skill in the art. A representation of $\{A_{S,n}\}$ is shown in FIG. 6 which depicts a raw three-dimensional scene map of a simulated object of interest 30. In this example, the target area 22 and object of interest 30 is a simulated scene with a "hill" of point scatterers and a column of point scatterers above the hill of point scatterers. The trajectory 28 that develops the effective synthetic aperture $L_{H,eff}$ and the effective synthetic aperture $L_{V,eff}$ comprises perturbations of a nominal linear glide slope GS. The perturbations are measured by the IMU. In one example, perturbations in orientation and/or position from the nominal glideslope GS may be measured by the IMU In one example, the MIMO back-projection imaging equation is given by:

$$I(x,\omega) = \sum_{l=1}^{N_T} \sum_{m=1}^{N_T} T_{lm} \phi(x_l, x_m) e^{-ik(|x-x_l|+|x-x_m|)} = \quad \text{(Equation 3)}$$

$$\sum_n A_{S,n} \left[ \sum_{l=1}^{N_T} T_l \frac{e^{ik(|x_{S,n}-x_l|-|x-x_l|)}}{4\pi |x_{S,n}-x_l|} \right]^2.$$

where $N_T$ represents the total number of MIMO receptions contributing to the data set and $\phi(x_l, x_m)$ represents a complex combination of data signals. The amplitudes $T_{lm}$ ($=T_l T_m$ in second form of Equation 3) allow control of relative amplitude and phasing of transmitted electromagnetic signals 20 and received back-scattered electromagnetic signals 24 across antenna array 16.

The complex combination of data signals data signals $\phi(x_l, x_m)$ is used to form a fixed frequency three-dimensional scene image function given by:

$$I(x,\omega)(k=\omega/c, \omega=2\pi f) \quad \text{(Equation 4)}.$$

An additional sum over the frequency band yields range resolution given by:

$$I(x) = \quad \text{(Equation 5)}$$

$$\sum_{\omega \in band} I(x, \omega) \text{ where} \left( band \Leftrightarrow f_c - \frac{f_{BW}}{2} \leq f \leq f_c + \frac{f_{BW}}{2} \right).$$

Figure 7:
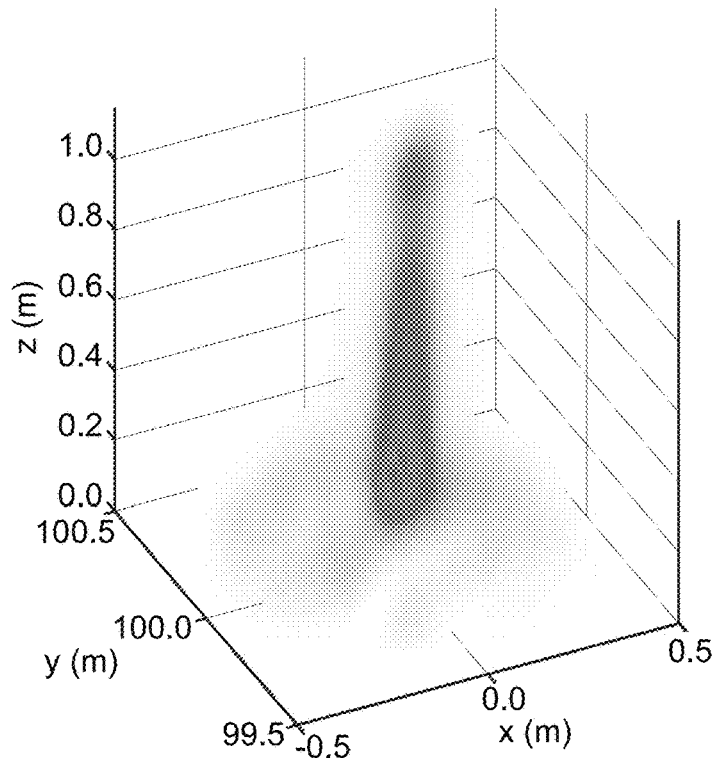
FIG. 7 is a two-dimensional rendering of the three-dimensional image of the object of interest.

Beam steering and antenna array 16 amplitude tapering may be utilized to control sidelobes. A representation of $I(x)$ is shown in FIG. 7, which depicts a three-dimensional rendering of the simulated object of interest 30. In this example, the target area 22 and object of interest 30 is a simulated scene with a "hill" of point scatterers and a column of point scatterers above the hill of point scatterers. Applying the MIMO back-projection logic as described above produces the three-dimensional rendering of the simulated hill of point scatterers and column of point scatterers as shown in FIG. 7.

In one example, the positions of antenna elements 18, in general, range over both real and synthetic aperture positions. Further, in one example, a key observation is that if the observation point x coincides with an object of interest 30 position $x_{S,n}$, then the corresponding phase factors cancel in every term in the l,m sum, and the result will produce a large, coherent O(N) peak; otherwise, the incoherent sum over the uncompensated phase factors produces a substantially attenuated result at a particular x value of $I(x,\omega)$.

The down range resolution performance $\Delta R$ of the imaging system 10 may be summarized as:

$$\Delta R = \frac{c}{2 f_{BW}} \quad \text{(Equation 6)}$$

where c represents the speed of light (i.e. about 300,000 km/s [roughly 186,000 miles a second or about 1 foot per nanosecond]) and $f_{BW}$ represents a radar pulse bandwidth. The down range resolution dimension $\Delta R$ calculation may be accomplished by the computer in communication with the at least one non-transitory computer readable storage medium 26 having instructions encoded thereon that, when executed by one or more processors, result in the calculation of the down range resolution dimension $\Delta R$.

The cross range resolution performance $\Delta X$ of the imaging system 10 may be summarized as:

$$\Delta X = R \frac{\lambda}{2 L_{H,eff}} \quad \text{(Equation 7)}$$

where R represents a slant range to target area 22, $\lambda$ represents a radar wavelength which is given according to:

$$\lambda = c/f_c \quad \text{(Equation 8)}$$

where $f_c$ represents a radar center frequency and where $L_{H,eff}$ represents an effective synthetic aperture length which is given according to:

$$L_{H,eff} = L_{SA} \sin(\theta_{image,horizontal}) + L_{arr} \cos(\theta_{image,horizontal}) \quad \text{(Equation 9)}$$

where $L_{arr}$ represents the antenna array length, $L_{SA}$ represents the motion segment length of the antenna array 16 in trajectory 28 and $\theta_{image,horizontal}$ represents an azimuthal drift angle which is the angle between GS' and H where GS' is the projection of the glide slope GS up to a horizontal plane HP as shown in FIG. 1. The cross range resolution dimension $\Delta X$ calculation may be accomplished by the computer in communication with the at least one non-transitory computer readable storage medium 26 having instructions encoded thereon that, when executed by one or more processors, result in the calculation of the cross range resolution dimension $\Delta X$.

The vertical range resolution performance $\Delta H$ of the imaging system 10 may be summarized as:

$$L_{V,eff} = L_{SA} \sin(\theta_{image}) + H_A \cos(\theta_{glide} + \theta_{image} - \theta_{arr}) \quad \text{(Equation 10)}$$

where $L_{V,eff}$ represents the effective synthetic aperture length, $L_{SA}$ represents the motion segment length of the antenna array 16 in trajectory 28, $\theta_{image}$ represents an angle of a trajectory of the object of interest 30 in the target area 22 relative to the glide slope GS of the vehicle, $\theta_{glide}$ represents an angle of the glide slope GS relative to horizontal, $\theta_{arr}$ represents an angle of antenna array 16 relative to vertical; and $H_A$ represents an antenna intrinsic physical height; and then calculating vertical resolution dimension $\Delta H$ according to:

$$\Delta H = R \frac{\lambda}{2 L_{V,eff}} \quad \text{(Equation 11)}$$

where $\lambda$ represents a nominal wavelength and R represents the slant range. The vertical resolution dimension $\Delta H$ calculation may be accomplished by the computer in communication with the at least one non-transitory computer readable storage medium 26 having instructions encoded thereon that, when executed by one or more processors, result in the calculation of the effective synthetic aperture length $L_{V,eff}$ and the vertical resolution dimension $\Delta H$.

It should be noted that Equations 7 and 11 highlight the dependence of the respective horizontal and vertical resolution dimensions $\Delta X$, $\Delta H$, due to trajectory 28 and the antenna array length $L_{arr}$ and antenna intrinsic physical height $H_A$. Particular perturbations in trajectory 28 that include directional components along either the LOA axis or LOD axis may modify the expressions of Equations 7 and 11 and slightly change the performance predictions as one of ordinary skill in the art would understand.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

Figure 8:
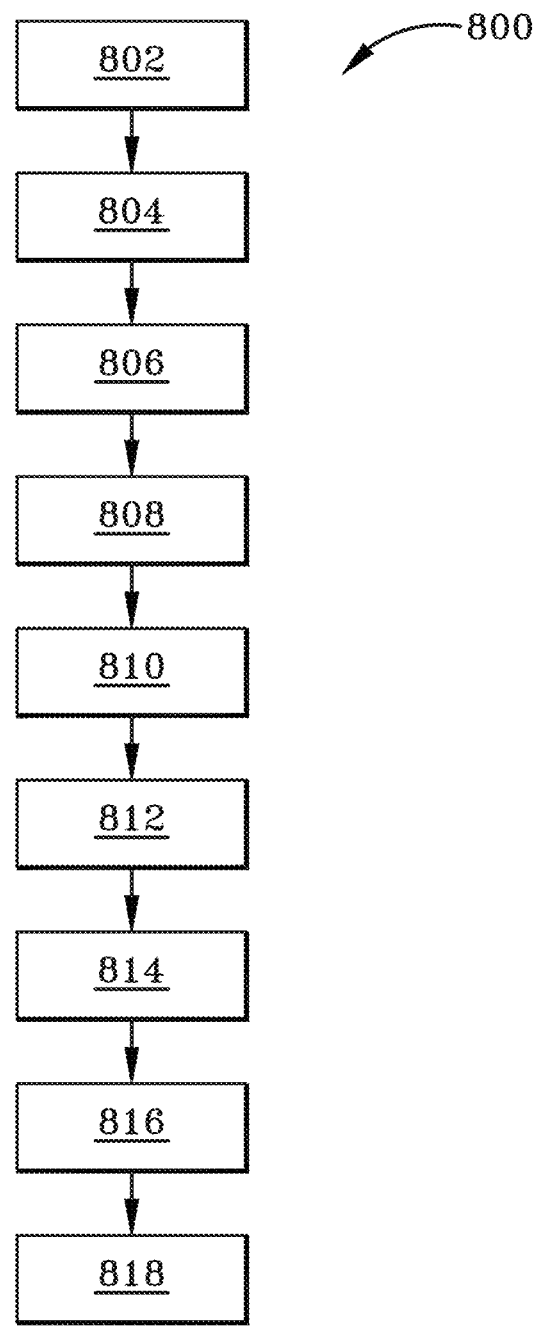
FIG. 8 is a flow chart depicting an exemplary method of generating high-resolution three-dimensional imagery.

FIG. 8 depicts an exemplary method in accordance with the present disclosure. In one example, a method for generating high-resolution imagery using electromagnetic signals is shown generally at 800. Mounting MIMO radar system 14 including antenna array 16 having plurality of antenna elements 18 on vehicle 12 is shown generally at 802. Moving vehicle 12 in trajectory 28 is shown generally at 804. Forming effective synthetic apertures in a nominal first and second direction is shown generally at 806. Transmitting electromagnetic signals 20 using one or more of the antenna elements 18 towards target area 22 is shown generally at 808. Illuminating target area 22 is shown generally at 810. Receiving back-scattered electromagnetic signals 24 reflected from target area 22 at one or more of the antenna elements 18 is shown generally at 812. Processing received back-scattered electromagnetic signals 24 is shown generally at 814. Generating a three-dimensional image with system performance characterized by: (a) down range resolution $\Delta R$, the down range resolution $\Delta R$ based on, at least in part, a bandwidth of the transmitted electromagnetic signals 20; (b) cross-range resolution $\Delta X$, the cross-range resolution $\Delta X$ based on, at least in part, the effective synthetic aperture antenna array length $L_{H,eff}$; and (c) vertical resolution $\Delta H$, the vertical resolution $\Delta H$ based on, at least in part, the effective synthetic aperture antenna array length $L_{V,eff}$ is shown generally at 816. Displaying the three-dimensional image is shown generally at 818.

As described the imaging system 10 may be used for all applications in which a radar system is useful. Particular applications considered are tactical remote sensing scenarios which may include, but are not limited to, scanning terrain and searching for and tracking objects of interest 30 nominally forward of a moving vehicle 12 to aid an operator in landing scenarios.

Also, various concepts may be exemplified as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the present disclosure. The various appearances "an embodiment," "one embodiment," "some embodiments," "one particular embodiment," or "other embodiments," or the like, are not necessarily all referring to the same embodiments.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the present disclosure is not limited to the exact details shown or described.

The invention claimed is:

1. A system for generating high-resolution imagery using electromagnetic signals comprising:
   a moveable vehicle;
   a multiple-input multiple-output (MIMO) radar system carried by the vehicle, the MIMO radar system comprising a nominally forward-looking one-dimensional antenna array having a plurality of antenna elements configured to be transmitters and receivers; wherein the vehicle and the nominally forward-looking one-dimensional antenna array move in a nominally forward moving trajectory forming effective synthetic apertures in a nominal first and second direction; and wherein the plurality of antenna elements transmits electromagnetic signals towards a target area; and wherein the plurality of antenna elements receives back-scattered electromagnetic signals reflected from the target area; and
   at least one non-transitory computer readable storage medium having instructions encoded thereon that, when executed by one or more processors, result in the following operations for generating high-resolution three-dimensional imagery based on back-scattered electromagnetic signal data with system performance characterized by:
   (a) down range resolution $\Delta R$;
   (b) cross-range resolution $\Delta X$; and
   (c) vertical resolution $\Delta H$; the operations configured to exploit the effective synthetic apertures in the nominal first and second direction to improve cross-range resolution $\Delta X$ and vertical resolution $\Delta H$ based on, at least in part, the movement of the vehicle along the nominally forward moving trajectory and a width and height of the nominally forward-looking one-dimensional antenna array relative to the target area.

2. The system of claim 1, wherein the nominally forward-looking one-dimensional antenna array is a nominally forward-looking one-dimensional sparse antenna array.

3. The system of claim 2, wherein the antenna elements of the nominally forward-looking one-dimensional sparse antenna array are steerable.

4. The system of claim 2, the antenna elements of the nominally forward-looking one-dimensional sparse antenna array are fixed.

5. The system of claim 1, wherein the antenna elements are irregularly spaced.

6. The system of claim 1, wherein the nominally forward-looking one-dimensional antenna array is a nominally forward-looking one-dimensional dense antenna array.

7. The system of claim 1, wherein each of the antenna elements is configured to transmit sequentially while the plurality of antenna elements receive the back-scattered electromagnetic signals.

8. The system of claim 1, wherein the plurality of antenna elements are configured to transmit simultaneously with orthogonal coded waveforms and the plurality of antenna elements receive the back-scattered electromagnetic signals.

9. The system of claim 1, wherein the nominally forward moving trajectory that develops the effective synthetic apertures in the nominal first and second direction comprises perturbations from a nominal linear glide slope; and wherein the perturbations are measured by an inertial measurement unit.

10. The system of claim 1, wherein the plurality of antenna elements are configured as pairs of transmitter antenna elements and pairs of receiver antenna elements.

11. The system of claim 1, wherein the plurality of antenna elements are configured as multiple transmitters and multiple receivers.

12. A system for generating high-resolution imagery using electromagnetic signals comprising:
  a moveable vehicle;
  a multiple-input multiple-output (MIMO) radar system carried by the vehicle, the MIMO radar system comprising a nominally forward-looking one-dimensional antenna array having a plurality of antenna elements configured to be transmitters and receivers; wherein the vehicle and the nominally forward-looking one-dimensional antenna array move in a nominally forward moving trajectory forming an effective synthetic aperture in a nominal first direction; and wherein the plurality of the antenna elements transmits electromagnetic signals towards a target area; and wherein the plurality of the antenna elements receives back-scattered electromagnetic signals reflected from the target area; and
  at least one non-transitory computer readable storage medium having instructions encoded thereon that, when executed by one or more processors, result in the following operations for generating high-resolution three-dimensional imagery based on back-scattered electromagnetic signal data, the operations configured to exploit the effective synthetic aperture in the nominal first direction to improve the vertical resolution ΔH based on, at least in part, the movement of the vehicle in the nominally forward moving trajectory and a height of the nominally forward-looking one-dimensional antenna array relative to the target area.

13. A method for generating high-resolution imagery using electromagnetic signals comprising:
  mounting a multiple-input multiple-output (MIMO) radar system including a nominally forward-looking one-dimensional antenna array having a plurality of antenna elements on a vehicle;
  moving the vehicle in a forward trajectory;
  forming effective synthetic apertures in a nominal first and second direction;
  transmitting electromagnetic signals using the plurality of the antenna elements towards a target area;
  illuminating the target area;
  receiving back-scattered electromagnetic signals reflected from the target area at the plurality of the antenna elements;
  processing the received back-scattered electromagnetic signals;
  generating a three-dimensional image with system performance characterized by:
    (a) down range resolution ΔR;
    (b) cross-range resolution ΔX; and
    (c) vertical resolution ΔH; and
  displaying the three-dimensional image.

14. The method of claim 13, wherein the nominally forward-looking one-dimensional antenna array is a nominally forward-looking one-dimensional sparse antenna array.

15. The method of claim 14, wherein the antenna elements of the nominally forward-looking one-dimensional sparse antenna array are steerable.

16. The method of claim 14, the antenna elements of the nominally forward-looking one-dimensional sparse antenna array are fixed.

17. The method of claim 13, wherein the antenna elements are irregularly spaced.

18. The method of claim 13, wherein the nominally forward-looking one-dimensional antenna array is a nominally forward-looking one-dimensional dense antenna array.

19. The method of claim 13, wherein the nominally forward-looking one-dimensional antenna array of the MIMO radar system forms a combination of radar transmissions and receptions and collects associated data which includes a combination of real aperture data and synthetic aperture data.

20. The method of claim 19, further comprising:
  utilizing three-dimensional back-projection image formation instructions to process the combination of real aperture data and the synthetic aperture data; and
  generating a raw three-dimensional scene map.

21. The method of claim 20, further comprising:
  utilizing rendering display instructions to display the processed combination of real aperture data and synthetic aperture data as real-time pilotage quality imagery.

22. The method of claim 13, wherein each of the antenna elements is configured to transmit sequentially while the plurality of antenna elements receive the back-scattered electromagnetic signals.

23. The method of claim 13, wherein the plurality of antenna elements are configured to transmit simultaneously with orthogonal coded waveforms and the plurality of antenna elements receive the back-scattered electromagnetic signals.

* * * * *